US011036612B1

(12) United States Patent
Kammath et al.

(10) Patent No.: US 11,036,612 B1
(45) Date of Patent: Jun. 15, 2021

(54) CENTRALIZED APPLICATION RESOURCE DETERMINATION BASED ON PERFORMANCE METRICS

(71) Applicant: VMWARE, INC., Palo Alto, CA (US)

(72) Inventors: V Vimal Das Kammath, Bangalore (IN); Zacharia George, Bangalore (IN); Vipul Chaudhary, Bangalore (IN); Madhan Sankar, Bangalore (IN); Mahesh Voleti, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 16/794,267

(22) Filed: Feb. 19, 2020

(30) Foreign Application Priority Data

Dec. 12, 2019 (IN) .............................. 201941051516

(51) Int. Cl.
*G06F 11/34* (2006.01)
*G06F 11/30* (2006.01)
*G06F 40/149* (2020.01)
*G06F 9/455* (2018.01)

(52) U.S. Cl.
CPC ...... *G06F 11/3466* (2013.01); *G06F 9/45558* (2013.01); *G06F 11/302* (2013.01); *G06F 40/149* (2020.01); *G06F 2009/45591* (2013.01); *G06F 2009/45595* (2013.01)

(58) Field of Classification Search
CPC .. G06F 11/3466; G06F 11/302; G06F 40/149; G06F 9/45558; G06F 2009/45591; G06F 2009/45595
See application file for complete search history.

(56) References Cited

U.S. PATENT DOCUMENTS

| 8,447,851 B1* | 5/2013 | Anderson | G06F 11/3082 709/223 |
| 9,935,830 B1* | 4/2018 | Mahapatra | H04L 41/0816 |
| 2006/0294221 A1* | 12/2006 | Graupner | H04L 43/067 709/224 |
| 2016/0301739 A1* | 10/2016 | Thompson | G06F 9/547 |
| 2019/0227780 A1* | 7/2019 | Keyser | G06F 9/547 |

* cited by examiner

*Primary Examiner* — Todd L Barker

(57) ABSTRACT

In one example, an application monitoring server may include a metric parser to receive performance metrics associated with an endpoint. Example performance metrics may be in a source format. Further, the metric parser may parse the received performance metrics. Furthermore, the application monitoring server may include a resource extractor to apply a transformation definition to the parsed performance metrics to determine a plurality of resources in a destination format. Example plurality of resources may be associated with an application being executed in the endpoint. Further, the resource extractor may present information associated with the plurality of resources on a graphical user interface.

19 Claims, 4 Drawing Sheets

CENTRALIZED APPLICATION RESOURCE DETERMINATION BASED ON PERFORMANCE METRICS

RELATED APPLICATIONS

Benefit is claimed under 35 U.S.C. 119(a)-(d) to Foreign Application Serial No. 201941051516 filed in India entitled "CENTRALIZED APPLICATION RESOURCE DETERMINATION BASED ON PERFORMANCE METRICS", on Dec. 12, 2019, by VMWARE, INC., which is herein incorporated in its entirety by reference for all purposes.

The present application is related in subject matter to U.S. patent application Ser. No. 16/794,273, which is incorporated herein by reference.

TECHNICAL FIELD

The present disclosure relates to computing environments, and more particularly to methods, techniques, and centralized systems for determining application resources based on performance metrics of an application.

BACKGROUND

In computing environments, such as networked computing environments, cloud computing environments, virtualized environments, and the like, different applications may be executed on endpoints. Example endpoint may be a physical computer system, a workload, and the like. In an example virtualized environment, multiple physical computer systems (e.g., host computing systems) may execute different workloads such as virtual machines, containers, and the like running therein. Computer virtualization may be a technique that involves encapsulating a representation of a physical computing machine platform into a virtual machine that may be executed under the control of virtualization software running on hardware computing platforms. The hardware computing platforms may also be referred as the host computing systems or servers. A virtual machine can be a software-based abstraction of the physical computer system. Each virtual machine may be configured to execute an operating system (OS), referred to as a guest OS, and applications. A container may be a data computer node that runs on top of a host OS without the need for a hypervisor or separate OS. Further, the applications running on the endpoints may be monitored to provide performance metrics (e.g., application metrics, operating system metrics, and the like) in real time to detect and diagnose issues.

Figure 1A:
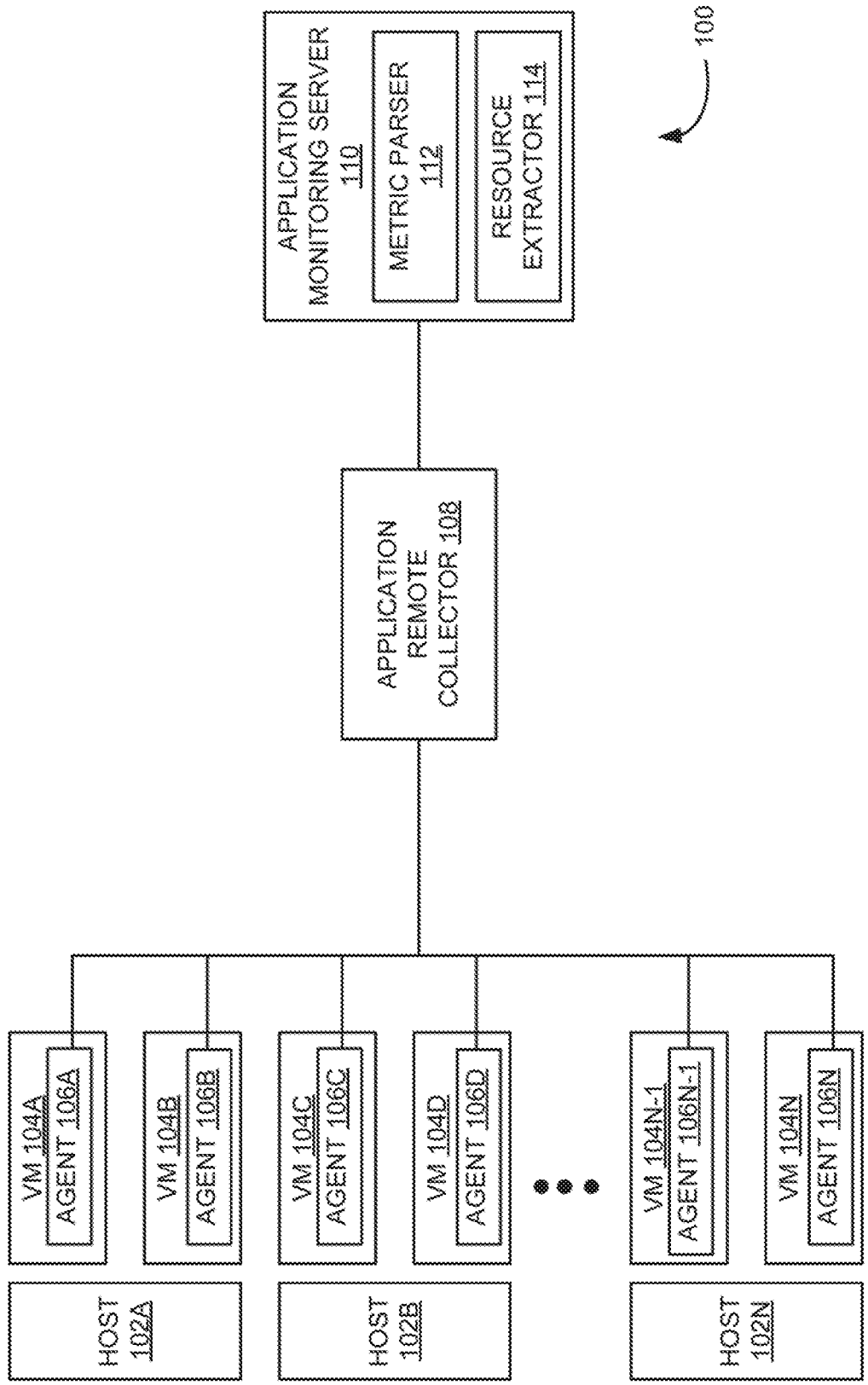
FIG. 1A is a block diagram of an example computing environment, including an application monitoring server to determine application resources based on performance metrics of an application.

The drawings described herein are for illustration purposes only and are not intended to limit the scope of the present subject matter in any way.

DETAILED DESCRIPTION

Examples described herein may provide an enhanced computer-based and network-based method, technique, and centralized system to determine application resources based on performance metrics of an application in a computing environment. Computing environment may be a physical computing environment (e.g. an on-premise enterprise computing environment or a physical data center) and/or virtual computing environment (e.g., a cloud computing environment, a virtualized environment, and the like).

The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include different endpoints (e.g., physical computers, virtual machines, and/or containers). For example, the computing environment may include multiple application hosts (i.e., physical computers) executing different workloads such as virtual machines, containers, and the like running therein. Example endpoints may execute different types of applications.

Further, performance monitoring of such applications has become increasingly important because application monitoring may aid in troubleshooting (e.g., to rectify abnormalities or shortcomings, if any) the applications. Application monitoring may be referred as application performance monitoring (APM) and/or application performance management (APM). Example performance monitoring tool or application or platform (e.g., VMware® vRealize Operations (vROps), Vmware Wavefront™, and the like) may receive performance metrics associated with applications from agents running in the endpoints. Further, the performance monitoring platform may display the performance metrics in a form of dashboards, for instance.

In some examples, the agents (e.g., Telegraf™) running in the endpoints may collect the performance metrics. However, the agents may not perform any function on the collected performance metrics to determine resources associated with the application. On the other hand, the performance monitoring platform may see value add in discovering and displaying the application resources and their relationships on the dashboards. For example, in the case of 'Tomcat Server', the performance monitoring platform may have to analyse the performance metrics to detect and represent the 'Tomcat Server' specific resources such as 'request processors', 'web modules', and the like. However, the performance monitoring platform may have to perform significant computation when the computing environment become more complex (e.g., as number of endpoints and corresponding applications increases). Hence, it is challenging for the performance monitoring platform to derive the application resources and their relationships.

In some other examples, specialized agents may be developed to collect and analyse the performance metrics to determine the application resources. Example specialized agents may discover application specific resources and their relationships in a desired model and send to the performance monitoring platform for presenting. However, cost and effort in developing such specialized agents may be significantly high. Further, such discovered resources in the particular model from the specialized agents may not be consumed by more than one type of performance monitoring platform as different performance monitoring platforms may require different resource models and hierarchies. For example, vROps may consume the analysed data in a format different than Wavefront. Also, any change in a resource model and hierarchy in the applications may require upgrading the specialized agent at the endpoint.

Examples described herein may provide a centralized approach to determine application resources based on performance metrics. Examples described herein may provide an application monitoring server including a metric parser to receive the performance metrics associated with an endpoint and parse the received performance metrics. Example received performance metrics may be in a source format. Further, the application monitoring server may include a resource extractor to apply a transformation definition to the parsed performance metrics to determine a plurality of resources in a destination format and present information associated with the plurality of resources on a graphical user interface. Example plurality of resources may be associated with an application being executed in the endpoint. Thus, examples described herein may eliminate a need for specialized agents as the application resources can be determined from the performance metrics collected by an agent.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1A is a block diagram of an example computing environment 100, including an application monitoring server 110 to determine application resources based on performance metrics of an application. Example computing environment 100 may be a cloud computing environment. For example, cloud computing environment 100 may be VMware vSphere®. Cloud computing environment 100 (e.g., a virtualized cloud computing environment) may include one or more computing platforms that support the creation, deployment, and management of virtual machine-based cloud applications.

Example cloud computing environment 100 may include multiple host computing systems 102A-102N, each executing corresponding ones of workloads (e.g., virtual machines 104A-104N, containers, and the like). Example host computing system (e.g., 102A-102N) may be a physical computer. The physical computer may be a hardware-based device (e.g., a personal computer, a laptop, or the like) including an operating system (OS). A virtual machine (e.g., 104A-104N) may operate with its own guest OS on the physical computer using resources of the physical computer virtualized by virtualization software (e.g., a hypervisor, a virtual machine monitor, and the like). A container may be a data computer node that runs on top of a host operating system (e.g., 102A-102N) without the need for the hypervisor or separate operating system.

In the below described examples, virtual machines 104A-104N may be considered as the endpoints executing multiple applications. However, a container or a physical machine may also be considered as an endpoint executing the applications. An application, also referred to as an application program or application software, may be a computer software package that performs a specific function directly for an end user or, in some cases, for another application. Examples of applications may include word processors, database programs, web browsers, development tools, image editors, communication platforms, and the like.

Further, endpoints 104A-104N may include corresponding agents 106A-106N. For example, each agent 106A-106N may run in a respective one of endpoints 104A-104N to monitor the applications running on corresponding endpoints 104A-104N. In one example, each agent 106A-106N may real-time monitor the applications to collect the performance metrics corresponding to an operating system and/or the applications associated with corresponding endpoints 104A-104N.

Further, agents 106A-106N may publish the performance metrics via a network to other systems for analyzing the performance metrics. Example network can be a managed Internet protocol (IP) network administered by a service provider. For example, the network may be implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

As shown in FIG. 1A, cloud computing environment 100 may include application remote collector 108 to collect the performance metrics of the operating system and/or the applications associated with endpoints 104A-104N, in run-time, for monitoring and troubleshooting the endpoints 104A-104N. In one example, application remote collector 108 may be implemented in a computing device that is connected external to application monitoring server 110 or may be implemented as a part of application monitoring server 110.

Further, cloud computing environment 100 may include application monitoring server 110. In one example, application monitoring server 110 may include a metric parser 112 and a resource extractor 114. Metric parser 112 may receive the performance metrics associated with endpoints 104A-104N via application remote collector 108. In one example, the performance metrics may be in a source format. For example, the source format may be a Wavefront format, InfluxDB format, MQ Telemetry Transport (MQTT) format, Advanced Message Queuing Protocol (AMQP) format, or the like. Furthermore, resource extractor 114 may apply a transformation definition to the performance metrics to determine a plurality of resources in a destination format. For example, each of the plurality of resources may be associated with corresponding applications being executed in endpoint 104A-104N. Further, the destination format may be compatible to a target application (e.g., performance monitoring applications or platforms such as vROps, Wavefront, and the like). Example metric parser 112 and resource extractor 114 may be described in FIG. 1B.

Figure 1B:
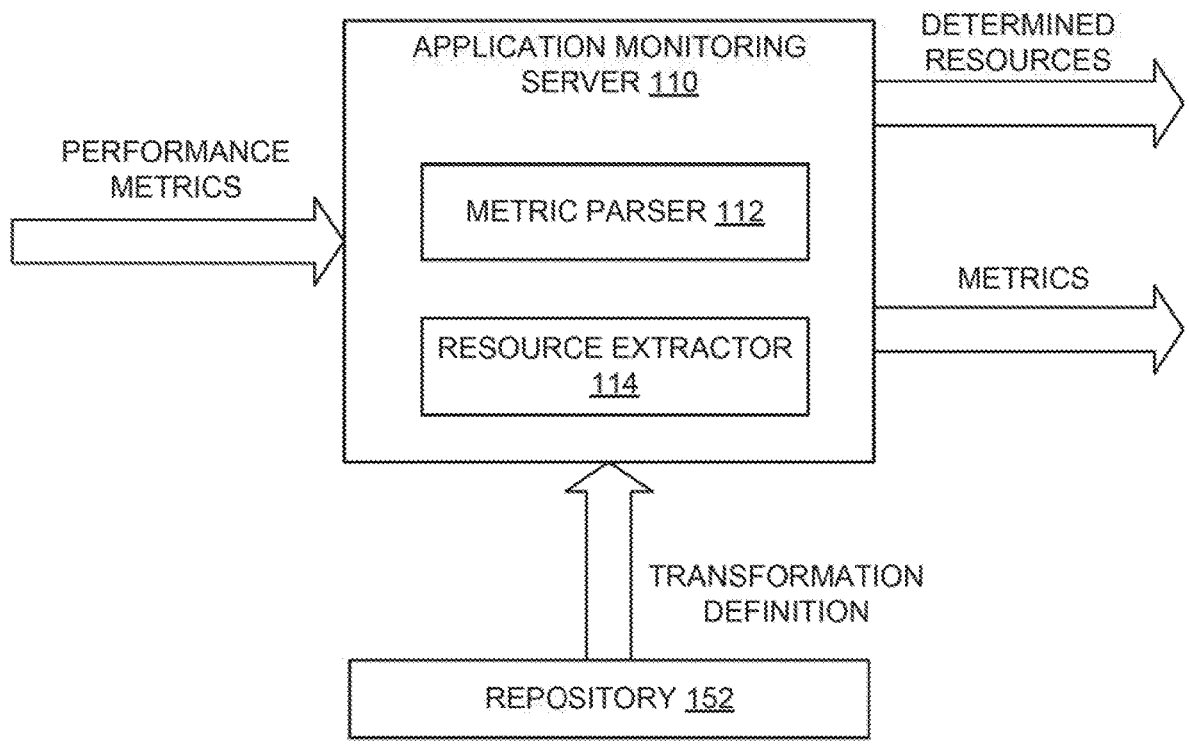
FIG. 1B is an example block diagram of the application monitoring server of FIG. 1A, depicting additional features.

FIG. 1B is a block diagram of application monitoring server 110 of FIG. 1A, depicting additional features. For example, similarly named elements of FIG. 1B may be similar in structure and/or function to elements described with respect to FIG. 1A. As shown in FIG. 1B, application monitoring server 110 may be communicatively connected to a repository 152. In one example, repository 152 may store a template including the transformation definition. Example transformation definition may provide knowledge of determining the plurality of resources associated with the application in the destination format. For example, the destination format may be compatible to the target application (e.g., vROps, Wavefront, and the like). In other words, application monitoring server 110 may have no knowledge about any application or corresponding resources. Thus, the knowledge may be declared in the transformation definition and provided as another input to application monitoring server 110. In one example, the transformation definition may be configured declaratively (e.g., via Extensible Markup Language (XML)) as described in FIG. 3.

As shown in FIG. 1B, application monitoring server 110 may include metric parser 112 to receive the performance metrics associated with an endpoint 104A. In one example, metric parser 112 may receive the performance metrics from agent 106A running in corresponding endpoint 104A via the network. In another example, metric parser 112 may receive the performance metrics from application remote collector 108 via the network. Example performance metrics may be in a source format (e.g., Wavefront format).

For example, metric parser 112 may receive the performance metrics associated with 'Microsoft® Structured Query Language (SQL) Server™' from the Telegraf agent, which may be in the Wavefront format. The performance metrics may include metrics that may measure the performance of various aspects of the application. Example subset of the performance metrics may be depicted in example 1. In the performance metrics shown in example 1, the raw performance metrics may not provide a list of resources explicitly. However, the performance metrics may include metrics such as reads/sec, writes/sec, and the like for each resource as shown in example 1.

MSSQL.Rows--reads-sec.tempdb 41064 serverName= "WIN-DUH251E2LAM" type="DatabaseIO" source= "win2012-mssql2012-V13" vc_uuid="f43a2a5b-7cb2-49b5-9d45-62179df90935" vm_mor="vm-43"
MSSQL.Rows--reads-sec.ReportServerTempDB 3276 serverName="WIN-DUH25IE2LAM" type="DatabaseIO" source="win2012-mssql2012-V13" vc_uuid="f43a2a5b-7cb2-49b5-9d45-62179df90935" vm_mor="vm-43"
MSSQL.Rows--reads-sec.model 2503 serverName="WIN-DUH251E2LAM" type="DatabaseIO" source="win2012-mssql2012-V13" vc_uuid="f43a2a5b-7cb2-49b5-9d45-62179df90935" vm_mor="vm-43"
MSSQL.Rows--reads-sec.ReportServer 2650 serverName= "WIN-DUH251E2LAM" type="DatabaseIO" source= "win2012-mssql2012-V13" vc_uuid="f43a2a5b-7cb2-49b5-9d45-62179df90935" vm_mor="vm-43"
MSSQL.Rowswritesec-.tempdb 3000 1528808928 server-Name="WIN-MSSQL" type="Database10" source="my_win_2016" vc_uuid="419d2d2b-7c45-4ac1- . . .

Example 1

Further, metric parser 112 may parse the received performance metrics. In one example, metric parser 112 may parse the performance metrics to extract relevant information from the performance metrics. For example, metric parser 112 may parse the performance metrics depicted in example 1 to index (e.g., metric name, value, time stamp, source tag, point tag, and the like) the performance metrics as depicted in Table 1:

TABLE 1

| | |
|---|---|
| Metric Name | MSSQL.Rows—write—sec-.tempdb |
| Value | 3000 |
| Time Stamp | 1528808928 |
| Source Tag | serverName="WIN-MSSQL" |
| Point Tag | type="DatabaseIO" source="my_win_2016" vc_uuid="419d2d2b-7c45-4ac1- |

Thus, metric parser 112 may parse the performance metrics to omit irrelevant data such as the point tags and timestamp as they may not have significance in the context of determining the application resources.

Further, application monitoring server 110 may include a resource extractor 114 to apply the transformation definition to the parsed performance metrics to determine a plurality of resources in a destination format. For example, the plurality of resources is associated with an application being executed in endpoint 104A. In one example, resource extractor 114 may apply transformation rules defined in the transformation definition to the parsed performance metrics to determine the plurality of resources in the destination format that may be compatible to the target application. Example transformation definition is depicted in example 2.

<ResourceDefinition kind="mssql" name="Microsoft SQL Server on {source}">
  <ResourceIdentifier key="INSTANCE" value="{servername}"/>
  <ResourceIdentifier key="VCID" value="{vc_uuid}"/>
  <ResourceIdentifier key="VMMOR" value="{vm_mor}"/>
  <ResourceDefinition kind="mssql_database" name="{ }">
    <ResourceIdentifier key="VCID" value="{vc_uuid}"/>
    <ResourceIdentifier key="VMMOR" value="{vm_mor}"/>
    <ResourceIdentifier key="INSTANCE" value="{servername}"/>
    <ResourceIdentifier key="DATABASENAME" value="{ }"/>
    <AttributeDefinition key="summary|Recovery-Model" filterName="MSSQL.Recovery-Model-SIMPLE" isProperty="true" value="SIMPLE" ignoreMetricByValue="0" ignoreMetricByName="Total"/>
    <AttributeDefinition key="summary|Recovery-Model" filterName="MSSQL.Recovery-Model-FULL" isProperty="true" value="FULL" ignoreMetricByValue="0" ignoreMetricByName="Total"/>
    <AttributeDefinition key="summary|Recovery-Model" filterName="MSSQL.Recovery-Model-BULK. LOGGED" isProperty="true" value="BULK. LOGGED" ignoreMetricByValue="0" ignoreMetricByName="Total"/>
  </ResourceDefinition>
</ResourceDefinition>

Example 2

For example, the transformation definition may be represented in a transformation definition language. Example transformation definition language may be an Extensible Markup Language (XML)-based transformation definition language. The transformation definition depicted in example 2 may illustrate:

a. There may be only one instance of the mssql resource created for each instance of 'SQL Server' and the name may be post fixed with the 'source' tag value.
b. For each instance of mssql, there could be multiple instances of database resource and the instances are enumerated/discovered using a metric search policy by matching a part of the metric name and extracting the database name using the 'name' tag pattern.
c. The recovery-model metric may be present only for database resources and hence the number of times recovery-model metric appears in the collected data for each type of database may indicate the number of databases present. Further, the name of the database is the trailing suffix after the common suffix in the metric name 'recovery-model-bulk.logged'.
d. The database resource may have three metrics simple, full, and bulk logged, and the three metrics may have the prefix 'mssql.recovery-model' respectively followed by the database name.
e. There may be a provision to specify if the metric need to be considered as a property or not with the help of 'isproperty' flag.
f. If there is a specific metric that need to be ignored by name or value, that can be ignored using the respective filters 'ignoreMetricByName' and 'ignoreMetricByValue'.

Furthermore, resource extractor 114 may apply the transformation definition to the parsed performance metrics to determine hierarchical relationships between the plurality of resources. For example, when the transformation definition depicted in example 2 is run against the parsed performance metrics, resource extractor 114 may produce output of determined resources and the hierarchical relationship of the resources along with the performance metrics associated to each resource. In one example, the transformations performed using the transformation definition may not depend on the input data format. For example, the transformation definition may be applied on the performance metrics in the Wavefront format that Telegraf output plugin support. However, resource extractor 114 may support output plugin formats such as InfluxDB, MQTT, AMQP, and the like.

Figure 3:
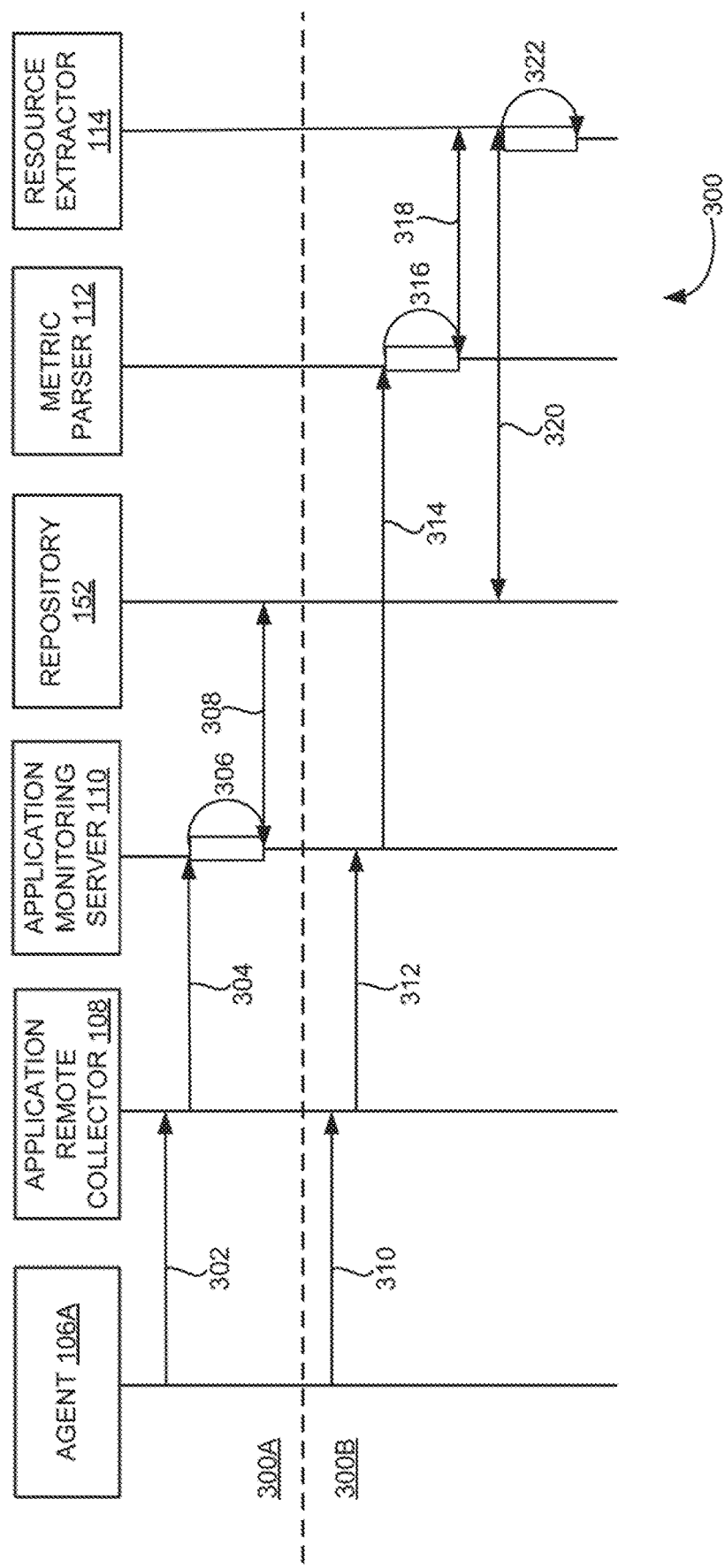
FIG. 3 is an example sequence diagram illustrating a sequence of events to determine application resources based on performance metrics of an application.

Further, resource extractor 114 may present the plurality of resources, the hierarchical relationships between the plurality of resources, and the performance metrics corresponding to the plurality resources on a graphical user interface. Example output of resource extractor 114 is depicted in FIG. 3. Thus, examples described herein may provide application monitoring server 110 that ingests raw performance metrics coming in any output plugin format (e.g., Wavefront, InfluxDB, and the like) from the agent (e.g., Telegraf) and outputs the discovered resource information, their relationships and their metrics in a desired format.

In some examples, the functionalities described herein, in relation to instructions to implement functions of metric parser 112, resource extractor 114, and any additional instructions described herein in relation to the storage medium, may be implemented as engines or modules comprising any combination of hardware and programming to implement the functionalities of the modules or engines described herein. The functions of metric parser 112 and resource extractor 114 may also be implemented by a respective processor. In examples described herein, the processor may include, for example, one processor or multiple processors included in a single device or distributed across multiple devices. In some examples, application monitoring server 110 can be a part of management software (e.g., vROps and Wavefront that are offered by VMware®).

Figure 2:
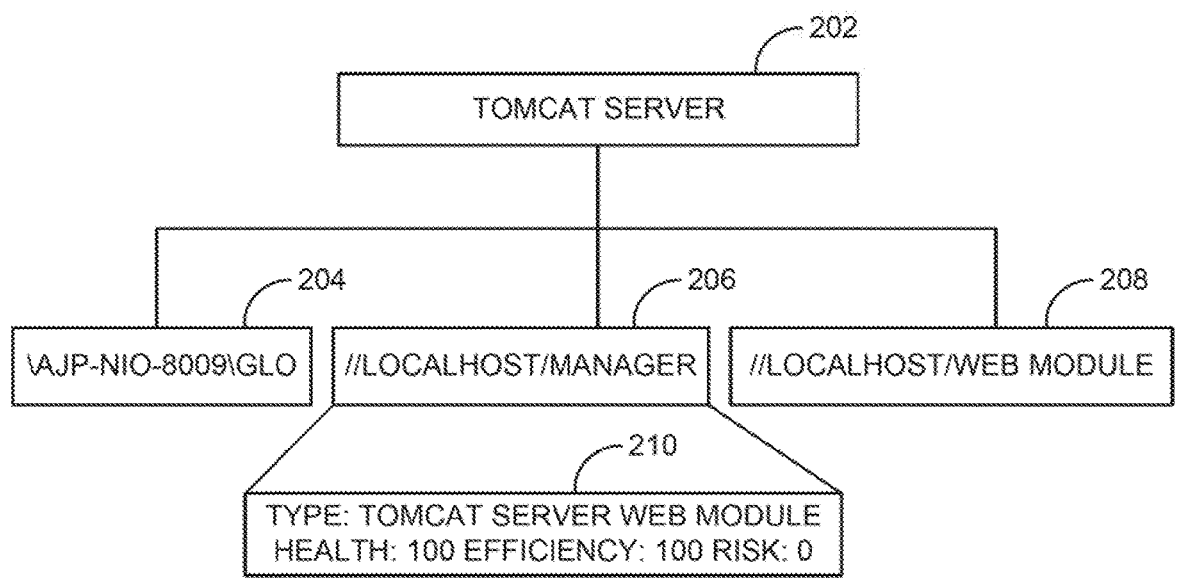
FIG. 2 illustrates an example representation of the determined application resources associated with the application.

FIG. 2 illustrates an example representation 200 of the determined application resources associated with the application 202. For example, a 'Tomcat Server' (e.g., application 202) is considered. In one example, an application monitoring server (e.g., application monitoring server 110 of FIGS. 1A and 1B) may determine resources associated with 'Tomcat Server' 202. Example resources (e.g., 204, 206, and 208) may include databases such as 'request processors' (e.g., 204) and 'web modules' (e.g., 206 and 208). Further, performance metrics associated to each resource may be presented. For example, the performance metrics of 'web module' (e.g., 206) is depicted as 210 in FIG. 2.

In the examples described herein, the resources such as databases and their hierarchical relationships are depicted. However, examples described herein may be implemented to determine other resources such as connectors, indices, clusters, and the like. Accordingly, the transformation definition may include necessary transformation rules to determine different kinds of resources.

FIG. 3 is an example sequence diagram 300 illustrating a sequence of events to determine application resources based on performance metrics of an application. For example, similarly named elements of FIG. 3 may be similar in structure and/or function to elements described with respect to FIGS. 1A and 1B. The sequence diagram may represent the interactions and the operations involved in determining the application resources based on the performance metrics of the application. FIG. 3 illustrates process objects including agent 106A, application remote controller 108, application monitoring server 110, repository 152, metric parser 112, and resource extractor 114 along with their respective vertical lines originating from them. The vertical lines of agent 106A, application remote controller 108, application monitoring server 110, repository 152, metric parser 112, and resource extractor 114 may represent the processes that may exist simultaneously. The horizontal arrows (e.g., 302, 304, 308, 310, 312, 314, 318, and 320) may represent the data flow steps between the vertical lines originating from their respective process objects (for e.g., agent 106A, application remote controller 108, application monitoring server 110, repository 152, metric parser 112, and resource extractor 114). Further, activation boxes (e.g., 306, 316, and 322) between the horizontal arrows may represent the process that is being performed in the respective process object.

In one example, the sequence of events to determine the application resources may be segregated into design phase 300A (e.g., 302 to 308) and runtime phase 300B (310 to 322). During design phase 300A, transformation definition used to determine the application resources may be generated based on historical performance metrics. During runtime phase 300B, the application resources may be determined using the generated transformation definition.

At 302, application remote collector 108 may retrieve historical performance metrics corresponding to a predefined period. Example historical performance metrics may be associated with an application running in endpoint 104A corresponding to the predefined period. In one example, application remote collector 108 may retrieve the historical performance metrics from agent 106A as shown in FIG. 3. In another example, application remote collector 108 may retrieve the historical performance metrics from a data repository, where the historical performance metrics are stored.

At 304, application monitoring server 110 may receive the historical performance metrics associated with the application from application remote collector 108. At 306, application monitoring server 110 may generate transformation rules to determine a plurality of resources corresponding to the application using the historical performance metrics. In one example, application monitoring server 110 may define the transformation definition to include the transformation rules in a transformation definition language. At 308, application monitoring server 110 may store the transformation definition including the transformation rules in repository 152. Thus, the historical performance metrics may be collected for the predefined period corresponding to each application. Further, the historical performance metrics may be analyzed in detail to generate the transformation definition, which may be used to identify and discover resources corresponding to each application. In one example, the transformation definition may be generated once and may be updated based on modifications in the resources corresponding to the applications.

At 310, application remote collector 108 may receive real-time performance metrics associated with the application from agent 106A. At 312, application monitoring server 110 may receive the performance metrics from application remote collector 108. At 314, metric parser 112 may further receive the performance metrics. In one example, the performance metrics may be in a source format. At 316, metric parser 112 may parse the received performance metrics.

At 318, resource extractor 114 may receive the parsed performance metrics from metric parser 112. At 320, resource extractor 114 may access the transformation definition from repository 152. At 322, resource extractor 114 may apply the transformation definition to the parsed performance metrics to determine a plurality of resources in a destination format. In one example, the plurality of resources may be associated with the application being executed in endpoint 104A. Thus, application monitoring server 110 may be agonistic of the format in which the performance metrics are collected and represented. Further, the transformation definition can be defined to cater to any format.

In one example, application monitoring server 110 including metric parser 152 and resource extractor 154 may be part of a performance monitoring platform (e.g., vROps, Wavefront, and the like). In this example, application monitoring server 110 may present information associated with the plurality of resources, hierarchical relationships between the plurality of resources, and the performance metrics corresponding to the plurality resources on a graphical user interface. In another example, application monitoring server 110 may provide the determined plurality of resources to the performance monitoring platform (e.g., vROps, Wavefront, and the like). Further, the performance monitoring platform may display information of the plurality of resources associated with the application on a dashboard, for instance.

In one example, application monitoring server 110 may reside in the performance monitoring platform such as vROps. For example, application and operating system management pack, which may be available in vROps, may read the transformation file and create a transformation definition. The transformation definition may be created once when the transformation file (e.g., template metafile is read). Thus, the code for reading the transformation file may be kept in 'onDescribe' and 'onConfigure' method. Further, the transformation file may help adapter instance to read the data or messages (e.g., the performance metrics) coming from application remote collector 108 and convert the data into the format vROps understands. For example, in the metafile XML format, vROps may create a mssql resource with Port, virtual circuit identifier (VCID), and VMMOR identifiers. The identifier information may be fetched from Wavefront message available as part of point tags. Once the resource is created, the adapter may parse each mssql message coming in Wavefront format from application remote collector 108 and update the performance metrics defined in definitions.xml in the format of attribute definitions.

Example Processes

Figure 4:
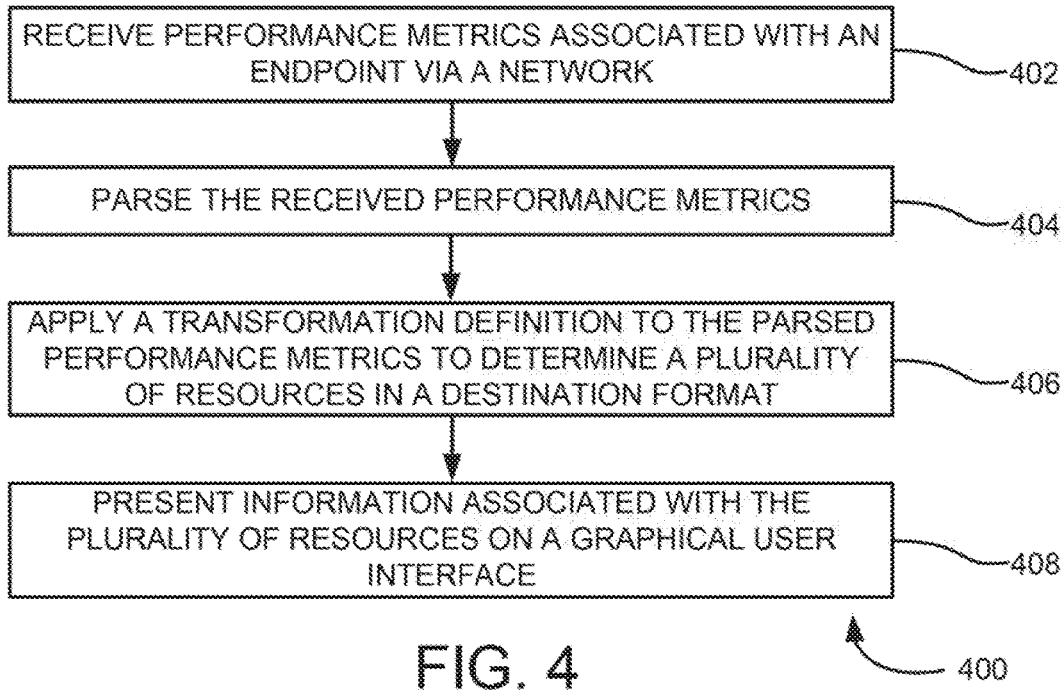
FIG. 4 is an example flow diagram illustrating determining application resources based on performance metrics of an application.

FIG. 4 is an example flow diagram 400 illustrating determining application resources based on performance metrics of an application. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, the performance metrics associated with an endpoint may be received via a network. Example performance metrics may be in a source format. In one example, the performance metrics may be published by an agent running in the endpoint. Further, the performance metrics may include at least one of application metrics and operating system metrics. For example, the performance metrics may include performance metric values associated with at least one of central processing unit (CPU), memory, storage, graphics, and network traffic. At 404, the received performance metrics may be parsed.

At 406, a transformation definition may be applied to the parsed performance metrics to determine a plurality of resources in a destination format. Example plurality of resources may be associated with an application being executed in the endpoint. In one example, applying the transformation definition may include applying transformation rules defined in the transformation definition to the parsed performance metrics to determine the plurality of resources in the destination format that is compatible to a target application. Example transformation rules may be defined in a transformation definition language. For example, the transformation definition language may be, but not limited to, an XML-based transformation definition language.

Further, applying the transformation definition may further includes applying the transformation definition to the parsed performance metrics to determine hierarchical relationships between the plurality of resources. Upon determining the hierarchical relationships, the hierarchical relationships between the plurality of resources and the performance metrics corresponding to the plurality resources may be displayed on the graphical user interface. At 408, information associated with the plurality of resources may be presented on a graphical user interface.

In one example, the transformation definition used to determine the plurality of resources may be stored in a repository prior to executing the steps of 402-408. Generating the transformation definition may include retrieving historical performance metrics corresponding to a predefined period. Further, transformation rules may be generated to determine the plurality of resources corresponding to the application using the historical performance metrics. Furthermore, the transformation definition may be defined to include the transformation rules in a transformation definition language. Thus, example described herein may provide a centralized mechanism to determine application specific resources from the performance metrics in a generalized manner.

Figure 5:
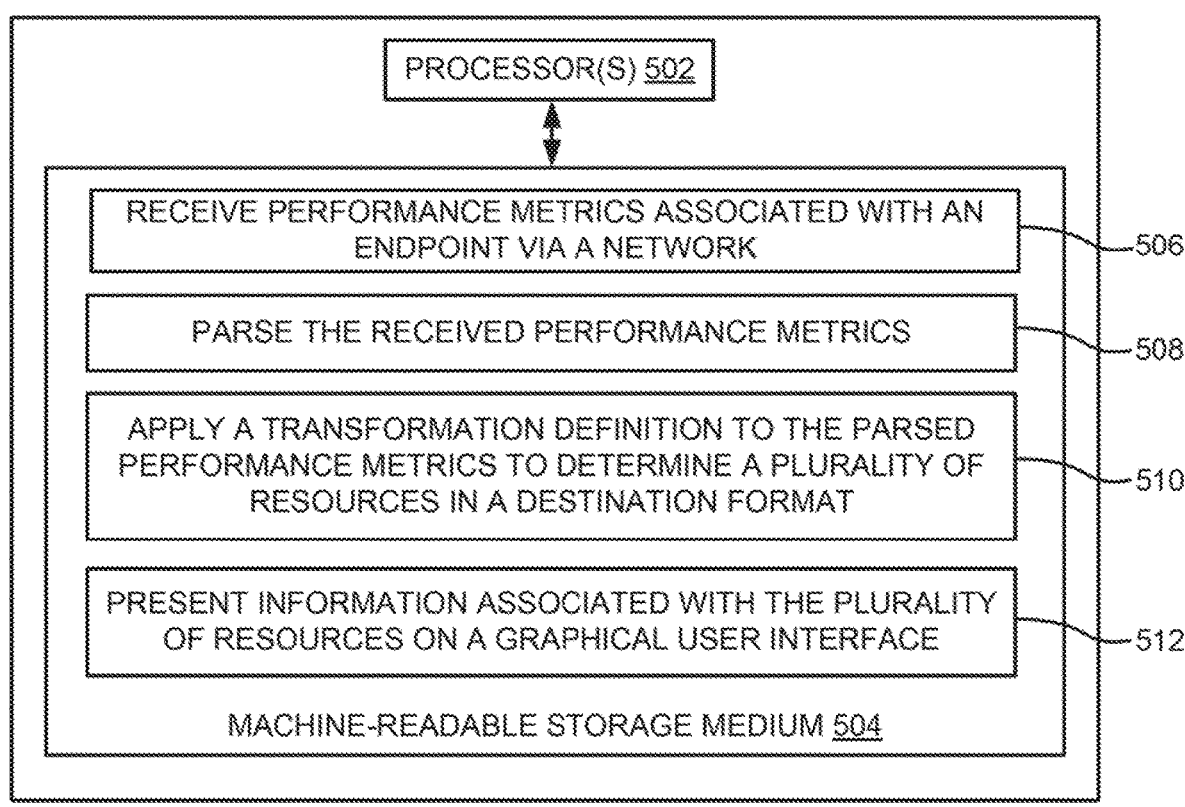
FIG. 5 is a block diagram of an example computing device including a non-transitory computer-readable storage medium storing instructions to determine application resources based on performance metrics of an application.

FIG. 5 is a block diagram of an example computing device 500 including non-transitory computer-readable storage medium 504 storing instructions to determine application resources based on performance metrics of an application. Computing device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-512. In an example, instructions 506-512 may be executed by processor 502 to determine application resources based on performance metrics of an application. Instructions 506 may be executed by processor 502 to receive performance metrics associated with a plurality of endpoints. Example performance metrics may be in a source format. In one example, the performance metrics may be published by an agent running in the endpoint. Example performance metrics may include at least one of application metrics and operating system metrics associated with the plurality of endpoints. For example, the performance metrics may include performance metric values associated with at least one of central processing unit (CPU), memory, storage, graphics, and network traffic.

Instructions 508 may be executed by processor 502 to parse the received performance metrics. Instructions 510 may be executed by processor 502 to apply a transformation definition to the parsed performance metrics to determine a plurality of resources, in a destination format, associated with each application being executed in the plurality of endpoints. In one example, instructions 510 to apply the transformation definition may include instructions to apply transformation rules defined in the transformation definition to the parsed performance metrics to determine the plurality of resources in the destination format that is compatible to a target application. Instructions 512 may be executed by processor 502 to present information associated with the plurality of resources on a graphical user interface.

Further, instructions may be executed by processor 502 to apply the transformation definition to the parsed performance metrics to determine hierarchical relationships between the plurality of resources. Furthermore, instructions may be executed by processor 502 to present the hierarchical relationships between the plurality of resources and the performance metrics corresponding to the plurality resources on the graphical user interface.

Further, instructions may be executed by processor 502 to retrieve historical performance metrics of applications running in the plurality of endpoints corresponding to a predefined period. Furthermore, instructions may be executed by processor 502 to generate transformation rules to determine the plurality of resources corresponding to the applications using the historical performance metrics. Further, instructions may be executed by processor 502 to define the transformation definition to include the transformation rules in a transformation definition language.

Examples described in FIGS. 1A-5 can be implemented in monitoring platform products such as vRealize Operations, Wavefront, and the like that are offered by VMware.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An application monitoring server comprising:
a metric parser to:
receive performance metrics associated with an endpoint, wherein the performance metrics are in a source format; and
parse the received performance metrics: and a resource extractor to:
apply a transformation definition to the parsed performance metrics to determine a plurality of resources in a destination format, wherein the plurality of resources is associated with an application being executed in the endpoint; and
wherein a repository is utilized to store a template including the transformation definition, wherein the transformation definition provides knowledge of determining the plurality of resources associated with the application in the destination format, and wherein the destination format Is compatible to a target application; and
present information associated with the plurality of resources on a graphical user interface.

2. The application monitoring server of claim 1, wherein the resource extractor is to:
apply the transformation definition to the parsed performance metrics to determine hierarchical relationships between the plurality of resources; and
present the hierarchical relationships between the plurality of resources and the performance metrics corresponding to the plurality resources on the graphical user interface.

3. The application monitoring server of claim 1, wherein the metric parser is to:
receive the performance metrics from an agent running in the endpoint, wherein the agent is to real-time monitor the application to collect the performance metrics corresponding to an operating system and/or the application associated with the endpoint.

4. The application monitoring server of claim 1, wherein the metric parser is to:
receive the performance metrics from an application remote collector via a network, wherein the application remote collector is to collect the performance metrics of an operating system and/or the application associated with the endpoint, in runtime, for monitoring and troubleshooting the endpoint.

5. The application monitoring server of claim 1, wherein the resource extractor is to:
apply transformation rules defined in the transformation definition to the parsed performance metrics to determine the plurality of resources in the destination format that is compatible to a target application.

6. The application monitoring server of claim 1, wherein the endpoint comprises one of a virtual machine, a container, and a physical machine.

7. A computer implemented method comprising:
receiving performance metrics associated with an endpoint via a network, wherein the performance metrics are in a source format;
parsing the received performance metrics;
applying a transformation definition to the parsed performance metrics to determine a plurality of resources in a destination format, wherein the plurality of resources is associated with an application being executed in the endpoint; and
wherein a repository is utilized to store a template including the transformation definition, wherein the transformation definition provides knowledge of determining the plurality of resources associated with the application in the destination format, and wherein the destination format is compatible to a target application; and
presenting information associated with the plurality of resources on a graphical user interface.

8. The computer implemented method of claim 7, wherein applying the transformation definition further comprises:
applying the transformation definition to the parsed performance metrics to determine hierarchical relationships between the plurality of resources; and
displaying the hierarchical relationships between the plurality of resources and the performance metrics corresponding to the plurality resources on the graphical user interface.

9. The computer implemented method of claim 8, wherein the performance metrics comprises at least one of application metrics and operating system metrics.

10. The computer implemented method of claim 8, wherein the performance metrics are published by an agent running in the endpoint, the performance metrics comprise performance metric values associated with at least one of central processing unit (CPU), memory, storage, graphics, and network traffic.

11. The computer implemented method of claim 8, wherein applying the transformation definition comprises:
applying transformation rules defined in the transformation definition to the parsed performance metrics to determine the plurality of resources in the destination format that is compatible to a target application.

12. The computer implemented method of claim 11, wherein the transformation rules are defined in a transformation definition language, and wherein the transformation definition language is an XML-based transformation definition language.

13. The computer implemented method of claim 7, further comprising:
retrieving historical performance metrics corresponding to a predefined period;
generating transformation rules to determine the plurality of resources corresponding to the application using the historical performance metrics; and
defining the transformation definition to include the transformation rules in a transformation definition language.

14. A non-transitory machine-readable storage medium encoded with instructions that, when executed by a computer, cause the computer to:
receive performance metrics associated with a plurality of endpoints, wherein, the performance metrics are in a source format;
parse the received performance metrics:
apply a transformation definition to the parsed performance metrics to determine a plurality of resources, in a destination format, associated with each application being executed in the plurality of endpoints; and
wherein a repository is utilized to store a template including the transformation definition, wherein the transformation definition provides knowledge of determining the plurality of resources associated with the application in the destination format, and wherein the destination format is compatible to a target application; and
present information associated with the plurality of resources on a graphical user interface.

15. The non-transitory machine-readable storage medium of claim 14, wherein instructions to apply the transformation definition further comprise instructions to:

apply the transformation definition to the parsed performance metrics to determine hierarchical relationships between the plurality of resources; and present the hierarchical relationships between the plurality of resources and the performance metrics corresponding to the plurality resources on the graphical user interface.

16. The non-transitory machine-readable storage medium of claim 14, wherein the performance metrics comprises at least one of application metrics and operating system metrics associated with the plurality of endpoints.

17. The non-transitory machine-readable storage medium of claim 14, wherein the performance metrics are published by an agent running in the endpoint, the performance metrics comprise performance metric values associated with at least one of central processing unit (CPU), memory, storage, graphics, and network traffic.

18. The non-transitory machine-readable storage medium of claim 14, wherein instructions to apply the transformation definition comprise instructions to apply transformation rules defined in the transformation definition to the parsed performance metrics to determine the plurality of resources in the destination format that is compatible to a target application.

19. The non-transitory machine-readable storage medium of claim 14, further comprising instructions that, when executed by the computer, cause the computer to:

retrieve historical performance metrics of applications running in the plurality of endpoints corresponding to a predefined period;

generate transformation rules to determine the plurality of resources corresponding to the applications using the historical performance metrics; and define the transformation definition to include the transformation rules in a transformation definition language.

* * * * *